(12) United States Patent
Yu

(10) Patent No.: US 11,750,903 B2
(45) Date of Patent: Sep. 5, 2023

(54) ELECTRONIC DEVICE

(71) Applicant: BEIJING XIAOMI MOBILE SOFTWARE CO., LTD., Beijing (CN)

(72) Inventor: Tao Yu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 229 days.

(21) Appl. No.: 16/924,113

(22) Filed: Jul. 8, 2020

(65) Prior Publication Data
US 2021/0266430 A1 Aug. 26, 2021

(30) Foreign Application Priority Data
Feb. 26, 2020 (CN) .......................... 202010121333.5

(51) Int. Cl.
| | | |
|---|---|---|
| *H04N 23/54* | (2023.01) | |
| *G06F 1/16* | (2006.01) | |
| *H05K 5/00* | (2006.01) | |
| *H04M 1/02* | (2006.01) | |

(52) U.S. Cl.
CPC ........... *H04N 23/54* (2023.01); *G06F 1/1656* (2013.01); *G06F 1/1686* (2013.01); *H04M 1/0268* (2013.01); *H05K 5/0017* (2013.01); *H04M 1/0264* (2013.01)

(58) Field of Classification Search
CPC .... H04N 5/2253; H04N 23/54; H05K 5/0017; H04M 1/0264; H04M 1/0235; H04M 1/0266; H04M 1/0268; H04M 2250/16; G06F 1/1626; G06F 1/1647; G06F 1/1652; G06F 1/1656; G06F 1/1686
See application file for complete search history.

(56) References Cited

U.S. PATENT DOCUMENTS

| | | | |
|---|---|---|---|
| 2017/0115944 A1 | 4/2017 | Oh et al. | |
| 2019/0250667 A1* | 8/2019 | Fan .................. | H04M 1/0237 |
| 2019/0253540 A1* | 8/2019 | Fan .................. | H04M 1/0237 |
| 2019/0324503 A1* | 10/2019 | Myers ................ | G06F 1/1633 |
| 2020/0177771 A1* | 6/2020 | Noh .................. | H04M 1/0264 |

FOREIGN PATENT DOCUMENTS

| | | |
|---|---|---|
| CN | 107888809 A | 4/2018 |
| CN | 209642723 U | 11/2019 |
| EP | 3525426 A1 | 8/2019 |
| EP | 3525428 A1 | 8/2019 |

OTHER PUBLICATIONS

Search Report for EP Application 20188410.3, 7 pages, dated Feb. 2, 2021.
First Office Action issued to Chinese Application No. 202010121333.5 dated Apr. 6, 2022, (14p).
EPOA issued in Application No. 20188410.3, dated Mar. 15, 2023, (5p).
"Notch bei Smartphones Das bringt dieAussparung", (4p).

\* cited by examiner

*Primary Examiner* — Shahbaz Nazrul
(74) *Attorney, Agent, or Firm* — Arch & Lake LLP

(57) ABSTRACT

An electronic device is provided. The electronic device includes a device body, a camera and a display screen. The display screen includes a first body display portion and a second body display portion located opposite to each other, and a bent display portion coupled with at least one of the first body display portion and the second body display portion. The camera is located in an end region of the device body.

12 Claims, 6 Drawing Sheets

ELECTRONIC DEVICE

CROSS-REFERENCE TO RELATED APPLICATION

This application is filed based upon and claims the priority of Chinese Patent Application Serial No. 202010121333.5, filed on Feb. 26, 2020, the entire contents of which are incorporated herein by reference in their entireties.

TECHNICAL FIELD

The present disclosure relates to a field of electronic technology, and more particularly to an electronic device.

BACKGROUND

In the related art, a screen of an electronic device such as a mobile phone is only provided on a front face of the electronic device, which cannot meet various requirements of a user for display. However, due to an influence of a structural function of a functional module such as a camera, a button or the like, an auxiliary screen additionally arranged on a side face or a rear face of the electronic device cannot achieve a continuous display effect and satisfy a continuous display demand, thus reducing user experiences of the screen and the electronic device.

SUMMARY

Examples of the present disclosure provide an electronic device.

According to a first aspect of the present disclosure, an electronic device is provided. The electronic device may include a device body. The electronic device may also include a camera. The electronic device may further include a display screen. The display screen may be located in the device body and may include a first body display portion, a second body display portion, and a bent display portion. The first body display portion may be arranged opposite to the second body display portion, and the bent display portion may be coupled with at least one of the first body display portion and the second body display portion, such that the display screen surrounds the device body. The device body may include an end region, and the camera may be located in the end region.

It is to be understood that both the foregoing general description and the following detailed description are examples and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the disclosure.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of apparatuses and methods consistent with aspects related to the present disclosure, as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

In the related art, a screen of an electronic device such as a mobile phone is only provided on a front face of the electronic device, which cannot meet various requirements of a user for display. However, due to an influence of a structural function of a functional module such as a camera, a button or the like, an auxiliary screen additionally arranged on a side face or a rear face of the electronic device cannot achieve a continuous display effect and satisfy a continuous display demand, thus reducing user experiences of the screen and the electronic device.

Figure 1:
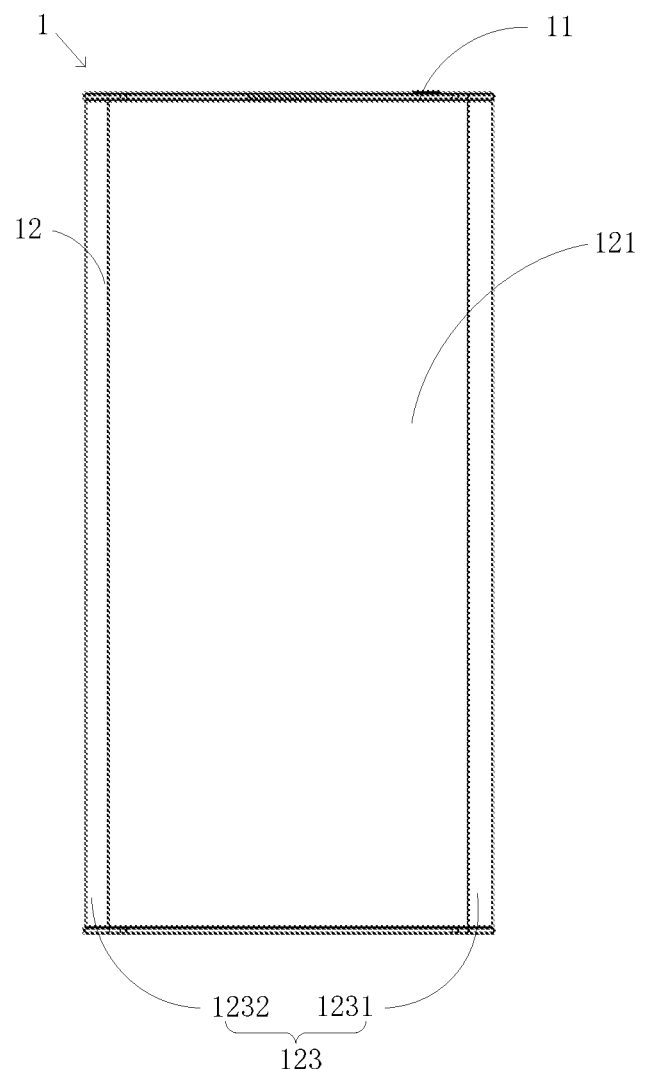
FIG. 1 is a front view of an electronic device, according to an example of the present disclosure.
Figure 2:
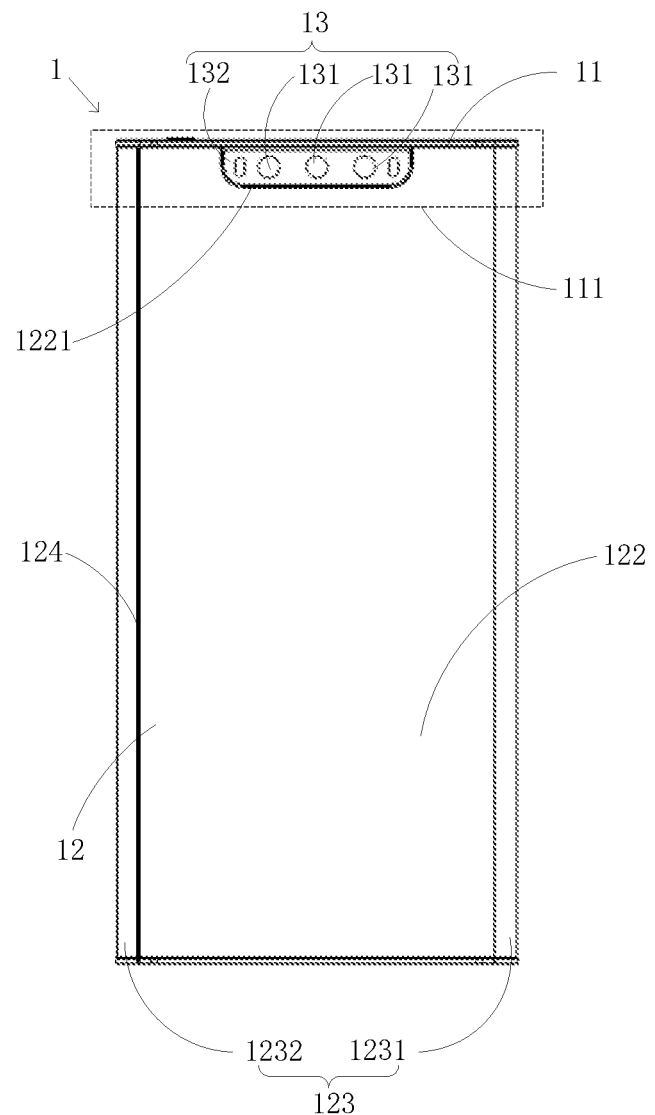
FIG. 2 is a rear view of an electronic device, according to an example of the present disclosure.

FIG. 1 is a front view of an electronic device in an illustrative example of the present disclosure. FIG. 2 is a rear view of an electronic device in an illustrative example of the present disclosure. As illustrated in FIG. 1 and FIG. 2, the electronic device 1 proposed by the present disclosure includes a device body 11, a camera module 13, and a screen module 12. The screen module 12 is assembled in the device body 11 and includes a first body display portion 121, a second body display portion 122, and a bent display portion 123. The first body display portion 121 is arranged opposite to the second body display portion 122, and the bent display portion 123 is connected with the first body display portion 121 and/or the second body display portion 122 such that the screen module 12 surrounds the device body 11. The device body 11 includes an end region 111, and the camera 13 is assembled in the end region 111. The camera module 13 may be, for example, a camera or a camera circuit with lens and image sensor. The screen module 12 may be, for example, a display screen or a screen circuit for displaying or outputting visual information.

In the above embodiment, the end region 111 may refer to a section structure at an end of the device body 11, i.e., the end region 111 is a section structure at a top and/or a bottom of the device body 11. When the display screen 12 surrounds the device body 11, the end region 111 is fitted with an upper edge or a lower edge of the display screen 12, such that the camera 13 arranged in the end region 111 avoids a direction of the display screen 12 surrounding the device body 11, thus reducing a structural interference of the camera 13 to the display screen 12.

The display screen 12 includes the first body display portion 121 and the second body display portion 122 opposite to each other, and the bent display portion 123 is connected with the first body display portion 121 and/or the second body display portion 122 to form a display surrounding the device body 11. The camera 13 is arranged in the end region 111 of the device body 11, thereby reducing the interference of the camera 13 on the surrounding display of the display screen 12, and hence improving a screen-to-body ratio and a screen display effect.

In some embodiments, the bent display portion 123 is connected with the first body display portion 121 and/or the second body display portion 122 to form an integrated display screen 12. That is, the first body display portion 121, the second body display portion 122 and the bent display portion 123 of the display screen 12 are integrally formed, and are fitted with the device body 11 while surrounding the device body 1.

The structure and arrangement of the display screen 12 are illustrated as follows.

In an embodiment, the bent display portion 123 includes a first bent display sub-portion 1231 and a second bent display sub-portion 1232. The first bent display sub-portion 1231 is connected with the first body display portion 121 and the second body display portion 122, respectively. The second bent display sub-portion 1232 is connected with the first body display portion 121, while is spliced and fitted with the second body display portion 122.

That is, the second bent display sub-portion 1232, the first body display portion 121, the first bent display sub-portion 1231 and the second body display portion 122 are connected in sequence, and the second bent display sub-portion 1232 and the second body display portion 122 are spliced end to end, thus forming the display screen 12 that surrounds the device body 11. The structure of the above display screen 12 is continuous, such that the display screen 12 has a continuous display effect in a direction surrounding the device body 11, thus improving the user experience.

The first body display portion 121 and the second body display portion 122 may be configured as main display faces of the display screen 12, which play a role of the main display, and the first bent display sub-portion 1231 and the second bent display sub-portion 1232 may be configured as auxiliary display faces of the display screen 12, which play a role of connecting the first body display portion 121 with the second body display portion 122 and providing a transition therebetween, such that the display screen 12 has a continuous display. Since the splicing is arranged between an arc bent display edge of the second bent display sub-portion 1232 and a plane display edge of the second body display portion 122, the influence of the splicing on the display effects of the first body display portion 121 and the second body display portion 122 is avoided. When the user watches the first body display portion 121, the first body display portion 121 is continuous with the first bent display sub-portion 1231 and the second bent display sub-portion 1232, so that there is no any discontinuous display, thus forming a full-screen display with stereoscopic and extended display effects on both sides of the first display body. When the user watches the second body display portion 122, the splicing only exists between the second body display portion 122 and the second bent display sub-portion 1232, and thus the overall display effect is improved. Furthermore, when the user watches the display screen 12 from a side face, the bent display portion 123 also has a display function, thus providing a stereoscopic display effect for the display screen 12.

Further, the second bent display sub-portion 1232 includes a first free side edge adjacent to the second body display portion 122, the second body display portion 122 includes a second free side edge adjacent to the second bent display sub-portion 1232, a gap 124 is formed between the first free side edge and the second free side edge, and a width of the gap 124 may be less than 2 mm. The above structure arrangement only forms a seam at the splicing of the first free side edge and the second free side edge, so as to reduce the interference of the seam on the overall display effect of the display screen 12. Moreover, the width of the above gap 124 is less than 2 mm, so as to reduce the perceptibility of naked eyes on the gap 124, thus improving the visual effect of the splicing of the first free side edge and the second free side edge, and improving the overall display effect of the display screen 12.

Alternatively, the width of the gap 124 may be adjusted appropriately according to a size of the electronic device 1 and a difference of a working scene that the display screen 12 is applied to. For example, when the electronic device 1 is a mobile phone, the width of the gap 124 may be less than 1 mm so as to improve the display effect of the display screen 12 of the mobile phone at the splicing. When the electronic device 1 is a medical terminal with a relatively large size, the width of the gap 124 may be less than 3 mm, etc.

In another embodiment, the bent display portion 123 includes one first bent display sub-portion 1231 and two second bent display sub-portions 1232. The one first bent display sub-portion 1231 is connected with the first body display portion 121 and the second body display portion 122, respectively. One of the two second bent display sub-portions 1232 is connected with the first body display portion 121, the other one of the two second bent display sub-portions 1232 is connected with the second body display portion 122, and the two second bent display sub-portions 1232 are spliced and fitted to define a splicing gap therebetween, thus also enabling the display screen 12 to achieve the display effect surrounding the device body 11, and reducing the influence of the splicing gap on the display effect.

In other embodiments, the gap of the display screen 12 formed by being spliced end to end may also be arranged at a front face, a rear face, a side face or other positions of the device body 11, which is not limited in the present disclosure.

It should be noted that the above display screen 12 may be a flexible screen, and the flexible screen surrounds the device body 11 by being bent. The above display screen 12 may be formed by adopting a Chip On Pi (COP) screen packaging process. A principle of the COP screen packaging is to bend a part of the screen directly, so as to bend a chip, a flat cable and the like on the screen to a rear face of a display region, thus further decreasing a size of a frame, reducing the influence of the chip, the flat cable and the like of the display screen 12 on the width of the gap 124, and improving the overall display effect of the display screen 12.

The camera 13 may include one camera 131 or a plurality of cameras 131. When the camera 13 includes the plurality of cameras 131, assembly positions and lens shooting directions of the plurality of cameras 131 may be identical or different, which is not limited in the present disclosure. Following illustrative descriptions are made by taking an example that the camera 13 includes three cameras 131, and the assembling positions and the lens shooting directions of the three cameras 131 are identical.

In some embodiments, the camera 13 includes a decoration member 132 and at least one camera 131, and the at least one camera 131 is assembled to the decoration member 132. The first body display portion 121 or the second body display portion 122 includes a relief portion 1221, and the decoration member 132 is assembled and fitted in the relief portion 1221. As illustrated in FIG. 1 and FIG. 2, three cameras 131 are assembled on the decoration member 132, and the second body display portion 122 is provided with the relief portion 1221 corresponding to a position of the camera 13. The relief portion 1221 is correspondingly arranged at an edge of the second body display portion 122, the camera 13 is assembled in the relief portion 1221, and the shooting directions of the three cameras 131 faces towards a space faced by the second body display portion 122, thus achieving a shooting function directly, reducing the structural interference of the camera 131 to other central display positions of the second body display portion 122, and improving the screen-to-body ratio of a used face of the device body 11 where the second body display portion 122 is. The decoration member 132 may be, for example, a camera holder, a decoration plate, a protective plate, or a structure plate.

In the above embodiments, the structural interference of the camera 13 to the first body display portion 121 is also avoided, and thus the first body display portion 121 has a full-screen display effect, such that the first body display portion 121 can serve as the front face of the display screen 12 for functions such as a video viewing, a function operation, a shooting preview, a picture display and the like. The second body display portion 122 serves as the rear face of the display screen 12 opposite to the first body display portion 121 for functions such as a selfie preview, a video chat, an auxiliary display, and the like.

The relief portion 1221 may be a notch formed in the second body display portion 122 and does not have a display function, and a shape of the notch is matched with a shape of an edge of the decoration member 132 of the camera 13.

For example, when the user turns on the camera 13 to shoot an external scene or person, the first body display portion 121 may face the user, and display operations such as the shooting preview is achieved through the first body display portion 121. When the camera 13 is turned on for taking a selfie, the second body display portion 122 may face the user and selfie taking functions such as the selfie preview is achieved through the second body display portion 122. The above display screen 12 surrounding the device body 11 and the camera 13 fitted in the relief portion 1221 achieve the functions of the external scene shooting and the selfie taking, reduce the arrangement position and the arrangement number of the camera 13, and improve the imaging quality of the selfie and the overall display effect of the display screen 12.

Figure 3:
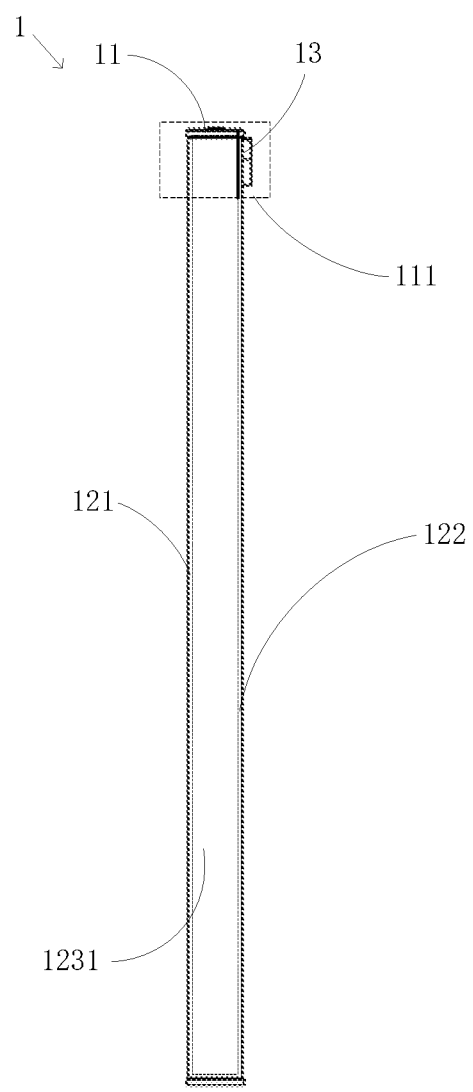
FIG. 3 is a side view of an electronic device, according to an example of the present disclosure.

Further, the relief portion 1221 may be arranged in the middle of the edge of the second body display portion 122, so as to improve an appearance effect of the camera 13 and the display screen 12 fitted with each other, and to reduce difficulties of arranging the relief portion 1221 in the second body display portion 122. The camera 13 may improve the shooting effect by increasing a thickness thereof. As illustrated in FIG. 3, the camera 131, the decoration member 132, and the like may protrude from the display screen 12, so as to increase an assembling space of the camera 13.

In other embodiments, the first body display portion 121 may also be provided with the relief portion 1221 corresponding to the position of camera 131. In this case, the first body display portion 121 may serve as the front face of the display screen 12, and the second body display portion 122 may serve as the rear face of the display screen 12. The usage way in which the first body display portion 121 and the second body display portion 122 cooperate with the camera 13 is the same with that of the above embodiments, and thus will not be repeated herein.

In other embodiments, the end region 111 includes an assembling end face 1112 perpendicular to the display screen 12, and the three cameras 131 are fitted in the assembling end face 1112. The assembling end face 1112 may be, for example, a body end face of the device 1 that is perpendicular to the display screen 12, and the three cameras 131 are fitted in the assembling end face 1112.

Figure 4:
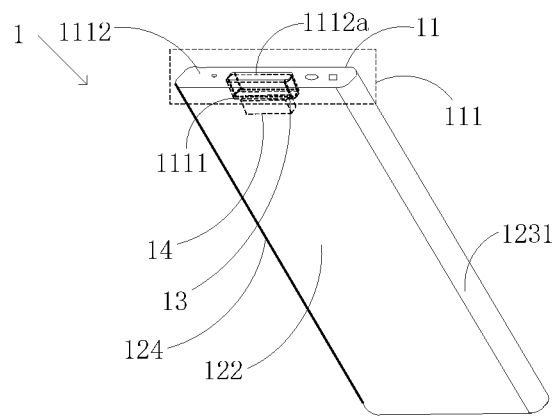
FIG. 4 is a perspective view of a camera in an unused state of an electronic device, according to an example of the present disclosure.
Figure 5:
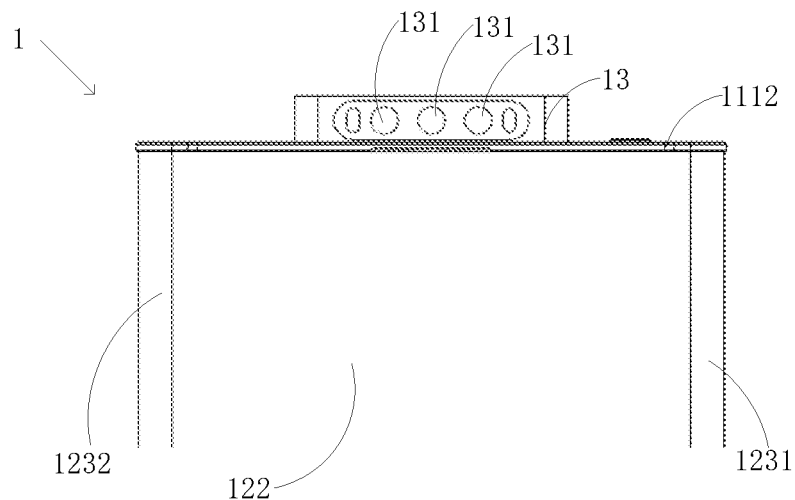
FIG. 5 is a schematic view of a camera in an ejected state of an electronic device, according to an example of the present disclosure.

In an embodiment, as illustrated in FIG. 4 and FIG. 5, the electronic device 1 further includes an ejection mechanism 14, the end region 111 further defines an internal assembling space 1111, the assembling end face 1112 is provided with a reserved hole 1112a communicated with the internal assembling space 1111, and the camera 13 is movably assembled in the internal assembling space 1111 and be fitted with the ejection mechanism 14 to selectively ejected out of or retracted into the internal assembling space 1111 through the reserved hole 1112a. The internal assembling space 1111 may be, for example, an internal space. When the camera 13 is not used, the camera 13 is retracted into the internal assembling space 1111, thus avoiding the structural interference of the camera 13 to the first body display portion 121 and the second body display portion 122, and improving the screen-to-body ratio and the overall display effect of the display screen 12. When the camera 13 is used, the camera 13 may be ejected out of the internal assembling space 1111 through the reserved hole 1112a, such that the camera 131 protrudes from the assembling end face 1112 of the end region 111, so as to achieve the shooting function. The lens of the camera 131 may face the first body display portion 121 or the second body display portion 122, which is not limited in the present disclosure.

Figure 6:
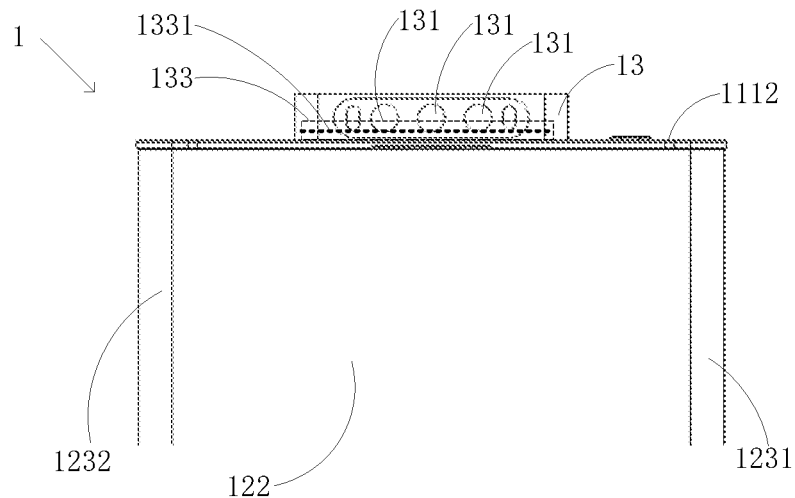
FIG. 6 is a schematic view of a camera in a flipped-out state, according to an example of the present disclosure.

In another embodiment, FIG. 6 is a schematic view of a camera in a flipped-out state in an illustrative example of the present disclosure. As illustrated in FIG. 6, the camera 13 is assembled on the above assembling end face 1112, and the camera 13 includes at least one camera 131 and a flipping mechanism 133. The flipping mechanism 133 includes a flipping shaft 1331 parallel to the assembling end face 1112, and the at least one camera 131 is assembled and fitted with the flipping shaft 1331. Based on the above structure arrangement, the camera 131 can be flipped relative to the assembling end face 1112, and stays in the flipped-out state when in use, while stays in a flipped-back state when not in use. When the camera 131 is in the flipped-back state, a lens optical axis of the camera 131 may be oriented towards a direction perpendicular to the assembling end face 1112, so as to reduce an overall height of the camera 13 on the assembling end face 1112, thus reducing a space occupation. When the camera 131 is to be in the flipped-out state, the camera 131 is flipped around the flipping shaft 1331 until the lens optical axis of the camera 131 is perpendicular to the display screen 12, so as to achieve the shooting function.

In another embodiment, the electronic device includes the ejection mechanism 14, and the camera 13 includes the flipping mechanism 133. The structural arrangement of the ejection mechanism 14 may be the same with that of the embodiment illustrated in FIG. 4 and FIG. 5, and the structural arrangement of the flipping mechanism 133 may be the same with that of the embodiment illustrated in FIG. 6. The ejection mechanism 14 may be, for example, a spring loaded structure that ejects or lifts the camera from within the phone when pressed or activated by the phone. The ejection mechanism 14 may also be, for example, a mechanical structure that uses gears, servos, electrical motors or magnetic devices to move the camera from within the phone outwardly when activated by the phone.

The flipping mechanism 133 includes the flipping shaft 1331 parallel to the assembling end face 1112, and the camera 131 is assembled and fitted with the flipping shaft 1331. The end region 111 also defines the internal assembling space 1111, and the assembling end face 1112 is provided with the reserved hole 1112a communicated with the internal assembling space 1111. The camera 131 is movably assembled in the internal assembling space 1111. With a fit of the camera 131 and the ejection mechanism 14, the camera 131 may be selectively ejected out of or retracted into the internal assembling space 1111 through the reserved hole 1112a. With a rotation shaft fit of the camera 131 and the flipping shaft 1331, the camera 131 can be flipped and rotated relative to the assembling end face 1112 after being ejected out of the assembling space 1111.

When the camera 13 is in use, the camera 13 may be ejected out of the internal assembling space 1111 through the reserved hole 1112a, such that the camera 131 protrudes from the assembling end face 1112 of the end region 1112, and then the camera 131 is flipped such that the lens optical axis of the camera 131 is perpendicular to the display screen 12, thus achieving the shooting function. When the camera 131 is not in use, the camera 131 may be flipped to the flipped-back state, or the camera may be retracted into the internal assembling space 1111 by the ejection mechanism 14. The combination of the ejection mechanism 14 and the flipping mechanism 133 enriches a usage state of the camera 13 and improves a usage convenience of the camera 13.

In another embodiment, the camera 131 may also be directly assembled on the assembling end face 1112, which not only avoids the structural interference to the display screen 12, but also reduces the structural complexity of the camera 13, thus reducing the manufacturing and assembling costs.

Further, the camera 131 may be fitted in the middle of the assembling end face 1112 to improve the structural aesthetics of the camera 13 and the overall aesthetics of the electronic device 1.

Figure 7:
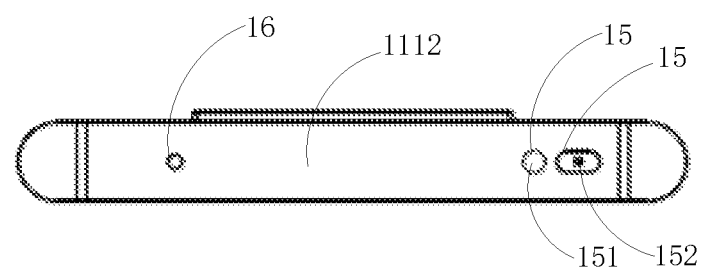
FIG. 7 is a top view of an electronic device, according to an example of the present disclosure.
Figure 8:
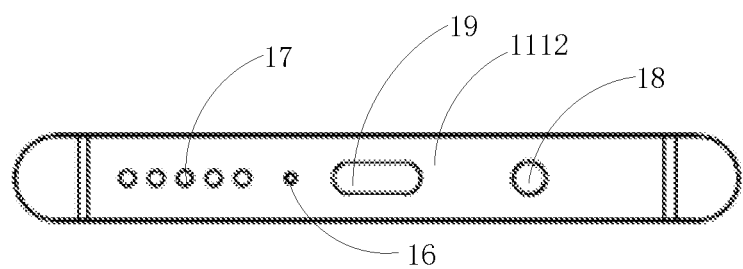
FIG. 8 is a bottom view of an electronic device, according to an example of the present disclosure.

In addition, as illustrated in FIG. 7 and FIG. 8, the end region 111 includes the assembling end face 1112 perpendicular to the display screen 12, and the assembling end face 1112 further includes at least one of a sound hole 17, a microphone hole 16, a data transmission interface 19, a headset hole 18 and an assembling hole 15. The assembling hole 15 may be, for example, a function hole. The sound hole 17 and the microphone hole 16 may be the microphone hole 16 and the sound hole 17. That is, positions of the sound hole 17 and the microphone hole 16 may be exchanged. The data transmission interface 19 may be a Universal Serial Bus (USB) interface. A headset is configured to be inserted into the headset hole 18. Functional modules such as a photosensitive sensor 151, a power button 152, and a volume button are configured to be assembled and fitted in the assembling hole 15, so as to achieve corresponding functions of the functional modules.

The end region 111 may be arranged at the top and/or the bottom of the device body 11, and the assembling end face 1112 may correspondingly be a top face at the top of the device body 11 and/or a bottom face at the bottom of the device body 11. When the camera 13 is fitted in the assembling end face 1112 at the top of the device body 11, the assembling hole 15 and the microphone hole 16 may be arranged in the assembling end face 1112 at the top of the device body 11. When the power button 152 is fitted in the assembling hole 15, it is convenient for the user to press for operations. When an infrared sensor 151 is fitted in the assembling hole 15, it is convenient to achieve a sensing function of the electronic device 1. Further, the data transmission interface 19, the sound hole 17, the microphone hole 16 and the headset hole 18 may be arranged in the assembling end face 1112 at the bottom of the device body 11, so as to reduce the structural occupation on the assembling end face 1112 at the top and achieve the corresponding functions.

In order to further reduce the structural occupation of the sound hole 17 on the assembling end face 1112, a screen sound-producing apparatus (not illustrated) may also be provided for the electronic device 1, such that the screen sound-producing apparatus may be fitted with the display screen 12, so as to achieve the sound transmission through the vibration of the display screen 12. Alternatively, the sound hole 17 may be arranged in the gap 124 between the display screen 12 and the device body 11 to reduce the arrangement cost of the sound output function and achieve the sound transmission.

Figure 9:
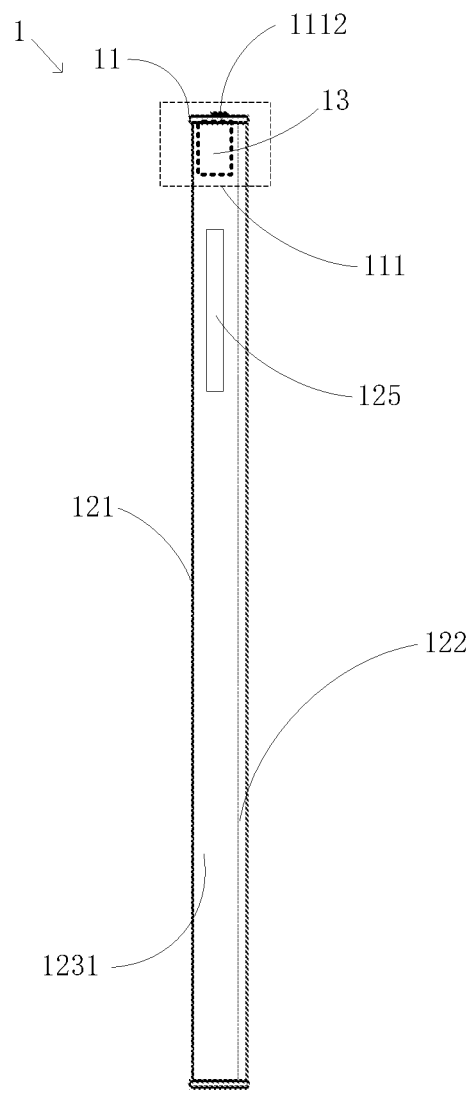
FIG. 9 is a side view of an electronic device, according to an example of the present disclosure.

Further, as illustrated in FIG. 9, a functional button such as the volume button 125 may also be a touch button arranged on the bent display portion 123 of the display screen 12, so as to achieve operations such as a volume adjustment by touching and operating a designed region of the bent display portion 123 of the display screen 12, thus reducing the structural occupation on the assembling end face 1112, and improving the usage intelligence and the user experience of the electronic device 1.

The display screen 12 includes the first body display portion 121 and the second body display portion 122 opposite to each other, and the bent display portion 123 is connected with the first body display portion 121 and/or the second body display portion 122 to form the display surrounding the device body 11. The camera 131 of the camera 13 is arranged in the end region 111 of the device body 11, thereby reducing the interference of the camera 131 on the surrounding display of the display screen 12, and improving the screen-to-body ratio and the screen display effect.

It should be noted that the electronic device 1 may be a mobile phone, a tablet computer, a vehicle terminal or a medical terminal, etc., which is not limited in the present disclosure.

Other embodiments of the present disclosure will be apparent to those skilled in the art from consideration of the specification and practice of the technical improvements disclosed here. This present disclosure is intended to cover any variations, uses, or adaptations of the present disclosure following the general principles thereof and including such departures from the present disclosure as come within the known or customary practice in the art. It is intended that the specification and examples be considered as examples only, with a true scope and spirit of the present disclosure being indicated by the following claims.

It will be appreciated that the present disclosure is not limited to the exact construction that has been described above and illustrated in the accompanying drawings and that various modifications and changes can be made without departing from the scope thereof. It is intended that the scope of the present disclosure only be limited by the appended claims.

What is claimed is:

1. An electronic device, comprising:
    a device body comprising an end region;
    a display screen located in the device body and comprising a first body display portion, a second body display portion, and a bent display portion, wherein the first body display portion is located opposite to the second body display portion, wherein the bent display portion is coupled with at least one of the first body display portion and the second body display portion such that the display screen surrounds the device body; and
    a camera located in the end region, wherein the camera comprises a decoration plate and at least one camera, wherein the at least one camera is coupled to the decoration plate, wherein one of the first body display portion and the second body display portion comprises a relief portion,
    wherein a relief portion is configured as a notch, and wherein the notch has a shape that matches a shape of the decoration plate,
    wherein the decoration plate is located and fitted in the relief portion so that the at least one camera is assembled in the relief portion, and
    wherein the at least one camera and the decoration plate protrude from the display screen in a thickness direction of the electronic device.

2. The electronic device according to claim 1, wherein the display screen is configured as an integrated display screen.

3. The electronic device according to claim 2, wherein the bent display portion comprises a first bent display sub-portion and a second bent display sub-portion,
    wherein the first bent display sub-portion is coupled with the first body display portion and the second body display portion, respectively, and
    wherein the second bent display sub-portion is coupled with the first body display portion, and is spliced and fitted with the second body display portion.

4. The electronic device according to claim 3, wherein the second bent display sub-portion comprises a first free side edge adjacent to the second body display portion, wherein the second body display portion comprises a second free side edge adjacent to the second bent display sub-portion, wherein a gap is located between the first free side edge and the second free side edge, and wherein the gap has a width of less than 2 mm.

5. The electronic device according to claim 1, wherein the end region comprises a body end face perpendicular to the display screen, and wherein the camera is fitted in the body end face.

6. The electronic device according to claim 5, wherein the camera is located on the body end face.

7. The electronic device according to claim 5, wherein the camera is fitted in the middle of the body end face.

8. The electronic device according to claim 1, wherein the end region comprises a body end face perpendicular to the display screen, and wherein the body end face comprises at least one of a sound hole, a microphone hole, a data transmission interface, a headset hole, and a function hole.

9. The electronic device according to claim 1, wherein the end region is located at a top of the electronic device.

10. The electronic device according to claim 1, wherein the end region is located at a bottom of the electronic device.

11. The electronic device according to claim 1, wherein the end region is located at a top and a bottom of the electronic device.

12. The electronic device according to claim 1, wherein the bent display portion comprises one first bent display sub-portion and two second bent display sub-portions,
    wherein the one first bent display sub-portion is coupled with the first body display portion and the second body display portion, respectively,
    wherein one of the two second bent display sub-portions is coupled with the first body display portion, another one of the two second bent display sub-portions is coupled with the second body display portion, and the two second bent display sub-portions are spliced and fitted to define a splicing gap therebetween.

* * * * *